US009264969B2

(12) United States Patent
Van Den Berg et al.

(10) Patent No.: US 9,264,969 B2
(45) Date of Patent: *Feb. 16, 2016

(54) DYNAMIC NETWORK SELECTION USING KERNELS

(71) Applicant: TTI Inventions A LLC, Wilmington, DE (US)

(72) Inventors: Eric Van Den Berg, Hoboken, NJ (US); Joseph Bryan Lyles, Arlington, VA (US); Praveen Gopalakrishnan, Beaverton, OR (US); Byunsuk Kim, Kyunggi-do (KR)

(73) Assignee: TTI Inventions A LLC, Wilmington, DE (US)

( * ) Notice: Subject to any disclaimer, the term of this patent is extended or adjusted under 35 U.S.C. 154(b) by 140 days.

This patent is subject to a terminal disclaimer.

(21) Appl. No.: 14/102,782

(22) Filed: Dec. 11, 2013

(65) Prior Publication Data

US 2014/0098794 A1 Apr. 10, 2014

Related U.S. Application Data

(63) Continuation of application No. 11/982,004, filed on Oct. 31, 2007, now Pat. No. 8,611,302.

(60) Provisional application No. 60/855,709, filed on Oct. 31, 2006.

(51) Int. Cl.
 *H04W 4/00* (2009.01)
 *H04W 36/30* (2009.01)
 *H04W 36/24* (2009.01)

(52) U.S. Cl.
 CPC .............. *H04W 36/30* (2013.01); *H04W 36/24* (2013.01)

(58) Field of Classification Search
 CPC .................................................... H04W 60/04
 USPC ......................................................... 370/332
 See application file for complete search history.

(56) References Cited

U.S. PATENT DOCUMENTS 7,065,372 B2 6/2006 Ham
7,197,308 B2 3/2007 Singhal et al.
(Continued)

FOREIGN PATENT DOCUMENTS

JP 2001-054168 2/2001
WO WO-2005/041462 5/2005

OTHER PUBLICATIONS

Ching-Hung, Lee eta I., "An Intelligent Handoff Algorithm for Wireless Communication Systems Using Grey Prediction and Fuzzy Decision System," Network, Sensing and Control, 2004 IEEE International Conference in Taipei, Taiwan, vol. 1, Mar. 21, 2004, pp. 541-546.

(Continued)

*Primary Examiner* — Gerald Smarth

(57) ABSTRACT

A method for determining whether to perform vertical handoff between multiple network. The method comprises obtaining a plurality of selection metrics for each network, calculating, for each of the other communication networks, a predicted utility value from at least the corresponding plurality of selection metrics using a variable kernel regression function, obtaining, for the current communication network, a second plurality of selection metrics; calculating a second predicted utility value for the current communication network from at least the corresponding second plurality of selection metrics using a second variable kernel regression function, comparing each of the predicted utility values for each of the plurality of other communication networks with the second predicted utility value and switching to one of the other communication networks having the highest predicted utility value, if the highest predicted utility value is greater than the second predicted utility value.

20 Claims, 4 Drawing Sheets

(56) References Cited

U.S. PATENT DOCUMENTS

| | | | |
|---|---|---|---|
| 7,996,236 B2 * | 8/2011 | Awater | H04W 36/22 370/332 |
| 8,081,607 B2 | 12/2011 | Brethereau et al. | |
| 2002/0181419 A1 | 12/2002 | Zhang et al. | |
| 2004/0136324 A1 | 7/2004 | Steinberg et al. | |
| 2004/0266442 A1 * | 12/2004 | Flanagan et al. | 455/445 |
| 2005/0083840 A1 | 4/2005 | Wilson | |
| 2005/0213542 A1 | 9/2005 | Guo et al. | |
| 2005/0239497 A1 * | 10/2005 | Bahl et al. | 455/552.1 |
| 2006/0073828 A1 | 4/2006 | Sipila | |
| 2006/0104313 A1 | 5/2006 | Haner et al. | |
| 2006/0182061 A1 | 8/2006 | Naghian | |
| 2006/0187858 A1 | 8/2006 | Kenichi et al. | |
| 2006/0199588 A1 | 9/2006 | Gao et al. | |
| 2006/0221933 A1 | 10/2006 | Bauer et al. | |
| 2006/0268756 A1 | 11/2006 | Wang et al. | |
| 2007/0008927 A1 | 1/2007 | Herz et al. | |
| 2007/0160007 A1 | 7/2007 | Wang et al. | |
| 2008/0014941 A1 | 1/2008 | Catovic et al. | |

OTHER PUBLICATIONS

Communication from the European Patent Office regarding Application 07 839 979.9, mailed Oct. 15, 2010.

European Search Report for EP Application 07839879.9, dated Oct. 6, 2010.

Final Office Action on U.S. Appl. 11/982,004, mailed Mar. 22, 2011.

McNair, J. et al., "Vertical Handoffs in Fourth-Generation Multinetwork Environments," IEEE Wireless Communications, IEEE Service Center, Piscataway, NJ, vol. 11, No. 3, Jun. 1, 2004, pp. 8-15.

Non-Final Office Action on U.S. Appl. 11/982,004, mailed Jan. 17, 2013.

Non-Final Office Action on U.S. Appl. 11/982,004, mailed Nov. 22, 2010.

Notice of Allowance on U.S. Appl. 11/982,004, mailed Aug. 13, 2013.

Notice of Rejection on Japanese Application 2009-534713, mailed Nov. 24, 2011 (English translation not available.).

Pollini, G. P., "Trends in Handover Design," IEEE Communications Magazine, vol. 34, No. 3, Mar. 1, 1996, p. 83.

Qingyang, Song, et al., "Quality of Service Provisioning in Wireless LAN/UMTS Integrated Systems Using Analytic Hierarch Process and Grey Relational Analysis," Global Telecommunications Conference Workshops, Nov. 29, 2004, pp. 220-224.

Van Den Berg E. et al., "Dynamic Network Selection Using Kerns" Proceedings of the 2007 IEEE International Conference on Communications Jun. 24-28, 2007, Glasgow, UK, pp. 6049-6054.

Wang et al., Policy-enabled handoffs across heterogeneous wireless networks, Mobile Computing Systems and Applications, Feb. 25-26, 1999. Proceedings WMCSA'9 9, pp. 51-60.

Wang et al., "Policy-enabled handoffs across heterogeneous wireless networks," Mobile Computing Systems and Applications, 1999, issued Feb. 25-26, 1999, 12 pages.

* cited by examiner

DYNAMIC NETWORK SELECTION USING KERNELS

RELATED APPLICATION

This application is a continuation of U.S. application Ser. No. 11/982,004, filed Oct. 31, 2007, which claims priority to U.S. Provisional Application No. 60/855,709 filed on Oct. 31, 2006.

FIELD OF THE INVENTION

This invention relates to mobile communication devices, mobile network managements, and handoff between multiple networks. More particularly, the invention relates to a method of determining whether to switch to a different network.

BACKGROUND

Mobile communication devices are commonly used in today's society. Most of these devices are capable of telecommunication using at least one network. Many of the newer mobile devices are now capable of telecommunication using multiple networks. The ability to switch between multiple networks in an efficient manner is essential for these newer devices. Future multiple networks are expected to combine several different radio-access technologies, such as 3G cellular, WLAN, and WiMax. This variety of access options gives a user with a multi-interface device the possibility of being "always best connected", using 'vertical' handoffs between the heterogeneous network technologies.

Vertical handoff is the process by which a mobile device switches between two different networks.

Traditional handover algorithms are based on a single attribute, signal strength, and handover policies are threshold based. These thresholds are easily determined based on physical parameters, including appropriate margins to avoid hysteresis.

However, traditional methods are not able to adapt to multiple criteria, dynamic user preferences, and changing network availability.

Several methods have been proposed to deal with multiple criteria, which rely on definition of an appropriate cost function, utility function, or weighting of different metrics. The number of different parameters involved can be large, and these parameters must often be completely specified by an expert ahead of time. Additionally, often the different parameters are not always available for a given network. Furthermore, when preferences change, the algorithm does not.

Therefore, there is a need for a network selection and vertical handover, which can adapt to dynamically changing preferences and environmental conditions of the networks.

SUMMARY OF THE INVENTION

Accordingly, disclosed is a method for determining whether to perform vertical handoff from a current communication network to one of a plurality of other communication networks. The method comprises the steps of obtaining for each of the plurality of other communication networks, a plurality of selection metrics, calculating for each of the plurality of other communication networks a predicted utility value from at least the corresponding plurality of selection metrics using a variable kernel regression function, obtaining for the current communication network a second plurality of selection metrics, calculating a second predicted utility value for the current communication network from at least the corresponding second plurality of selection metrics using a second variable kernel regression function, comparing each of the predicted utility values for each of the plurality of other communication networks with the second predicted utility value; and switching to one of the plurality of other communication networks having the highest predicted utility value, if the highest predicted utility value is greater than the second predicted utility value. The period of time in the future is different for each communication network and is a function of a network specific handoff latency. The communication network can be selected from 3G cellular, WLAN, and WiMax.

The method further comprises the steps of determining a switching cost for switching between the current communication network and each of the plurality of other communication networks, and switching to one of the plurality of other communication networks having the highest predicted utility value, if the highest predicted utility value is greater than the sum of the second predicted utility value, and the switching cost for switching between the current network and the communication network with the highest predicted utility.

The method further comprises the step of calculating an actual utility value for the current communication network. The step of calculating the actual utility value comprises the sub-steps of mapping each of the second plurality of metrics to attribute preference values, multiplying the attribute preference values by a variable weighting factor and adding linearly each of the multiplied attribute preference values.

Alternatively, the step of calculating the actual utility value for the current communication network comprises the step of evaluating the kernel regression function of the current network with current values obtained for each of the plurality of selection metrics.

The method further comprises a step of kernel learning. The kernel learning process comprises the steps of comparing the actual utility value with the second predicted utility value, calculating a difference between the actual utility value with the second predicted utility value based upon the comparison and updating the second variable kernel regression function if the difference is greater than a loss tolerance value. Additionally, the loss tolerance value is updated based upon the difference.

The variable kernel regression function is different for each communication network.

The method further comprises the step of storing the plurality of selection metrics for n previous periods of time.

The method further comprises the step of aging each of the previous plurality of selection metrics by multiplying a regression coefficient by an aging coefficient, where the aging coefficient is variable.

The selection metrics can include availability of a communication network, quality of service, and cost. The quality of service is a function of packet delay. The cost is a function of a monetary cost and energy cost. The selection metrics are periodically updated, by either calculating the metrics or receiving the metrics a priori and can be received by a network manager or managing entity. Alternative default selection metrics can be used. Additionally, the selection metrics can include at least information regarding a network policy. The network policy information can include user classification, user priority, emergency needs, and network conditions.

Also disclosed is another method for determining whether to perform vertical handoff from a current communication network to one of a plurality of other communication networks. The method comprises obtaining for each of the plurality of other communication networks a plurality of selection metrics, calculating for each of the plurality of other communication networks a predicted utility value from at least the corresponding plurality of selection metrics using a variable kernel regression function, obtaining for the current communication network a second plurality of selection metrics, calculating a second predicted utility value for the current communication network from at least the corresponding second plurality of selection metrics using a second variable kernel regression function, determining all pending applications running a device, obtaining application thresholds for each pending application, selecting an application threshold from the obtained application thresholds, calculating a difference between the second predicted utility value and each of the predicted utility values, comparing each of calculated differences with the selected application threshold; and switching to a network having a highest predicted utility and having a predicted utility greater than the selected application threshold. The first and second predicted utility values are determined for a predetermined period of time in the future.

Each application threshold can be different from each other application threshold based upon the particular application.

BRIEF DESCRIPTION OF THE DRAWINGS

These and other features, benefits, and advantages of the present invention will become apparent by reference to the following figures, with like reference numbers referring to like structures across the views, wherein.

DETAILED DESCRIPTION OF THE INVENTION

Figure 1:
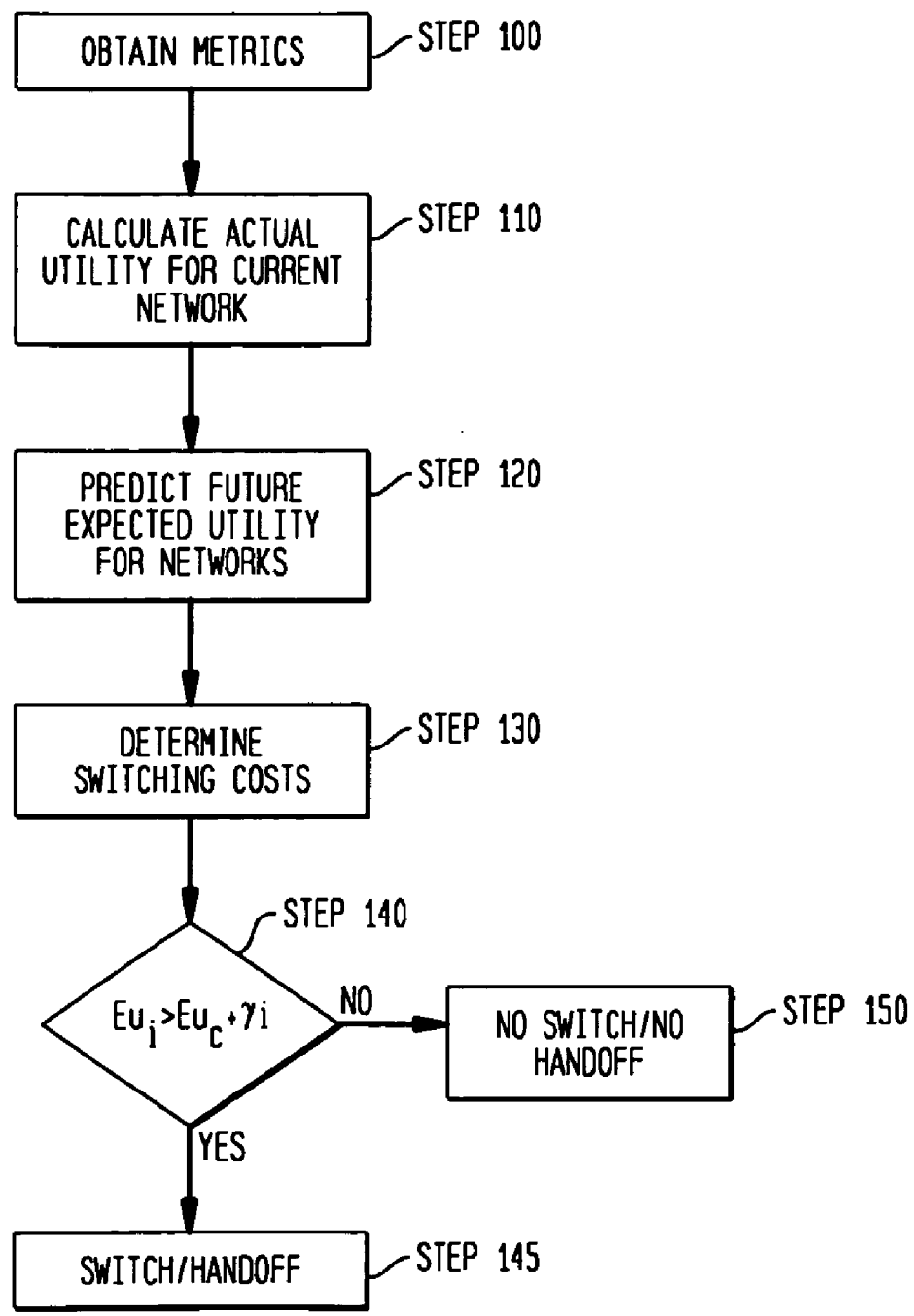
FIG. 1 illustrates a flow diagram of a method of determining handoff according to an embodiment of the invention.

FIG. 1 illustrates a flow diagram of a method of determining handoff according to an embodiment of the invention. The method considers multiple attributes and metrics for each network that a mobile device is capable of using for communication. The method also accounts for any dynamic change in the preferences. The networks can be any available communication network such as, but not limited to, 3G cellular, WLAN, and WiMax.

At Step 100, the attributes or metrics for each network is obtained. The metrics can be calculated or are a priori known. The actual values for each of the network attributes are not always known for all networks. For example, attributes of networks other than the current network may not be known. However, in an embodiment several of the attributes and metrics have default values. For example, a default packet delay for a network will be used if the actual packet delay is not known. Additionally, a default coverage range will also be used if the actual coverage range is not known.

In one embodiment, the attributes are divided into three main categories: availability, quality of service, and cost. 'Availability' means satisfaction of basic connectivity requirements. In another embodiment, Availability is determined based upon the signal strength, signal strength $RSS_i$>minimum threshold $\Delta_i$. In another embodiment, other input information such as input about the signal strength, observed packet delay, stability period, user speed, and additional information such as nominal coverage area, or coverage maps (if available) can also be used. 'Quality' is typically measured in (available) bandwidth that a network can offer. The nominal bandwidth of a network may be known a priori, but available bandwidth is hard or time-consuming to measure. In the preferred embodiment, packet delay for the network is used. In another embodiment, the average delays and delay variance is used, as well as maximum allowable values. 'Cost' has two components: Monetary cost and Energy cost. The Energy cost for a network interface is determined by two quantities: stationary energy (for just having the interface up) and transmission/reception energy. The Monetary cost is determined by the rate plan, and the cost per month, minute, or KB transferred In another embodiment, another category of metrics is used: network policies. A network policy includes short and/or long term policies such as user classifications, user priority, emergency service needs and network conditions.

Figure 2:
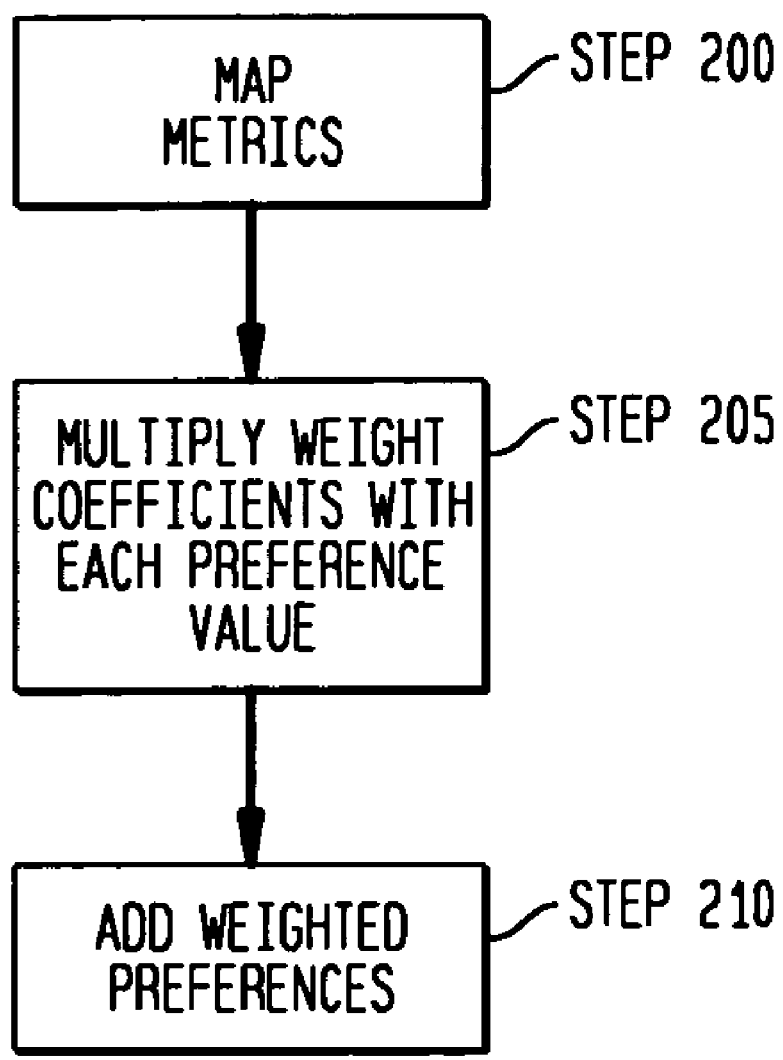
FIG. 2 illustrates a flow diagram of a method for calculating a utility of a network.

At Step 110, the actual utility of the network is calculated. FIG. 2 illustrates one method for calculating the actual utility, using a multiple attribute utility function. The utility function maps value of the attributes and metric to preference values. Specifically, the metrics are mapped to build a multi-attribute utility function, at Step 200.

In one embodiment, the Availability utility function $U_A(t)$ is defined as follows: $U_{A,i}(t)=1$, if $RSS_i(t+\Delta T_i)>\Delta_i$, $U_A(t)=0$ otherwise. Quality utility function $U_Q(t)$ as follows: $U_{Q,i}(t)=1$, if $D_i(t+\Delta T_i)<d_i$, $U_{Q,i}(t)=0$. Cost utility function as follows: $U_C(t)=\alpha U_M(t)+(1-\alpha)U_E(t)$. At Step 205, weights are multiplied to each preference value. The weights are variable to account for different hierarchy for each attribute. The weights are c1, c2, and c3. At Step 210, all of the weighted values are added together. The overall utility function for vertical handover is given by the linear combination:

$$U(t)=c_1U_A(t)+c_2U_Q(t)+c_3U_C(t).$$

In one embodiment, an expected utility is determined for each of the attributes, using a multiple attribute expected utility function. The expected utility and a predicted utility (which will be described later) are determined for a predetermined time period in the future $T+\Delta T_i$. The predetermined time period is network specific and is a function of a stability period. The stability period is equal to "make-up time+handover latency", or $\Delta T=T_{makeup}+L_{handover}$. Make-up time is the time to make up the loss (in utility) due to loss of network connectivity during handoff latency.

The make-up time and handover latency is also network specific. Only if an alternative network is predicted to be sufficiently better than the current one for a period greater than the stability period is a handoff worthwhile. Therefore, the expected utility is calculated for a period after the stability period.

The expected utility for the availability is:

$$A_i(t)=EU_{A,i}(t)=P(RSS_i(t+\Delta T_i)>\Delta_i) \quad (1),$$

where P is the probability. The probability is based upon coverage maps, user speed and variance.

The expected utility for the Quality of Service is:

$$Q_i(t) := EU_{Q,i}(t) = P(D_i(t+\Delta T_i) < d_i) \quad (2)$$

or $$Q_i(t) = \frac{Ed(t+\Delta T_i)}{D_{ave}^{Max}} + \frac{\text{var}(d(t+\Delta T_i))}{D_{var}^{Max}} \quad (3)$$

The expected utility for the cost is:

$$C_i(t):=EU_C(t)=\alpha EU_M(t)+(1-\alpha)EU_E(t) \quad (4)$$

The overall expected utility is given by:

$$EU_i(t)=c_1A_i(t)+c_2Q(t)+c_3C(t) \quad (5)$$

The expected utility at a future time $T+\Delta T_i$ is used as a means to predict future utility.

In another embodiment, the actual utility of the current network can be calculated using a kernel regression function with the inputs for the kernel regression function being the obtained metrics for the current network.

At Step 120, the future utility for each network is predicted. In one embodiment, the future or expected utility is predicted using equation 5 (the multiple attribute expected utility function). In another embodiment, the determination uses a kernel learning process with the selection of a kernel "K" and a kernel regression function "f". The kernel learning process allows the method and prediction to adapt to a change in the environment or network condition. The kernel learning process will be described later in detail.

At Step 130, the cost of switching between networks is determined. The cost of switching is a function of the stability period. The greater the stability period is, the higher the costs of switching.

At Step 140, a comparison of the expected utility $EU_i$ of network i to the expected utility of the current network, $EU_{current}$, for each alternative network i. The expected utility can be calculated using either the multiple attribute expect utility function or the kernal learning process with the kernal regression function. The switching cost is denoted as $\gamma_i$ for network i. If $EU_i - \gamma_i > EU_{current}$, or equivalently: $f(x_t^i) = EU_i > EU_{current} + \gamma_i = f(x_t^{current}) + \gamma_i$, then hand off to network i, at Step 145, otherwise the device stays connected to the current network, Step 150.

As noted above, the values and weights of the attributes and metrics can vary over time; therefore, the predicted utility must be dynamic and learned based upon prior mapping of input to utility.

The kernel regression function for predicting the utility is variable and can be different for each network. Additionally, the kernel regression function for predicting the utility can also be varied based upon a determined difference between an actual utility and an estimated utility. The kernel regression function is used to predict the utility of a network because all of the metrics, coefficients, loss tolerance, and expectations are not perfectly known.

The kernel learning process operates with X being defined as a set of inputs, e.g., vector of the collected metrics for a network and Y being defined as the set of outcome (expected utility) values where Y=R. R being real numbers. The mapping $f: X \rightarrow R$ is determined. A loss function l: R×Y→R given by l(f(x),y), is used to account for and penalize the deviation of estimates $f(x)$ from observed outcome labels y. The output $f$ of the algorithm is a hypothesis. The set of all possible hypotheses is denoted H. H is a Reproducing Kernel Hilbert Space (RKHS) induced by a positive semi-definite kernel k(.,.): X×X→R. This means that there exists a kernel k: X×X→R and an inner product $<\bullet,\bullet>_H$ such that (1) k has the reproducing property. $<f,k(x,\bullet)>_H = f(x)$, $\forall x \in X$, and (2) H is the closure of the span of all $k(x,\bullet)$, $x \in X$.

In other words, the hypotheses space H, a Reproducing Kernel Hibert Space (RKHS), contains all functions $f$ which can be written as linear combinations of kernel functions: for each $f \in H$. Additionally the kernel regression can be written as:

$$f(x) = \sum_{i=1}^{\infty} \alpha_i k(x_i, x). \tag{6}$$

where $(x_1, y_1), \ldots, (x_n, y_n)$ $x_i \in X$, $y_i \in Y$ are the observed (input,outcome) pairs, e.g. (metrics,utility) pairs.

The function "f" and its coefficients $\alpha_i$ in (6), are chosen to minimize a regularized risk:

$$R_{reg,\lambda}[f,S] := \frac{1}{m}\sum_{i=1}^{m} l(f(x_t), y_t) + \frac{\lambda}{2}\|f\|_H^2 \tag{7}$$

where the loss function is:

$$l(f(x),y) := \max(0, |y - f(x)| - \epsilon). \tag{8}$$

This loss function is called "ϵ-insensitive loss". E is a loss tolerance.

The ϵ-insensitive loss function ignores small errors, i.e., if the difference between the predicted value and the actual value is less than the tolerance, then the difference can be ignored. The advantage of using this loss function is that it creates a sparser kernel regression function f, which is therefore less computationally intensive to evaluate, e.g. more coefficients are zero. In an embodiment, ϵ can be adapted during the learning process.

The kernel k is defined in terms of the expected utility function EU(t) and its components A(t), Q(t) and C(t), which are given in formulas (1)-(5) above. In one embodiment, the starting point for the kernel is Mapping $\Phi: X \rightarrow R^3$ from observations $x_t$=(signal strength, coverage, delay, loss, jitter, energy usage) to $$\Phi(x_t) = (A(t), Q(t), C(t)) \tag{9}$$

The overall (expected) utility EU(t) is given as a linear combination of these vector components $$EU(t) = c_1 A(t) + c_2 Q(t) + c_3 C(t) = <c, \Phi(x_t)> \tag{10}$$

where $c = (c_1, c_2, c_3)$ and $\Phi(x_t)$ is defined as above, the observations and mapping value for the current network as baseline.

The mapping $f: X \rightarrow R$, represents the expected utility and can be defined in terms of $c = (c_1, c_2, c_3)$ and $\Phi(x_t)$ as $$f(x) := <c, \Phi(x)> \tag{11}$$

The kernel is defined as $$k(x_t, x) := <\Phi(x_t), \Phi(x)>. \tag{12}$$

In other words, the kernel regression function "f" is equivalent to the multiple attribute expected utility function. $x_t^i$ represents the state of network i at time t, and $f(x_t^i) = <c, \Phi(x_t^i)> = U_i(t)$.

Additionally this equivalence can be written as:

$$f(x_t^i) = <c, \Phi(x_t^{ie})> = EU_i(t) = \sum_{i=1}^{t-1} \alpha_i k(x_i, x)$$

Therefore, the kernel regression function "f", representing the predicted or expected utility, can be written as an expansion in terms of kernel k, without direct reference to the components A(t), Q(t) and C(t). An advantage of kernel methods is the kernel k is more compact and often easier to store than the original mapping $\Phi(x_i) = (A(i), Q(i), C(i))$ or its components.

Figure 3:
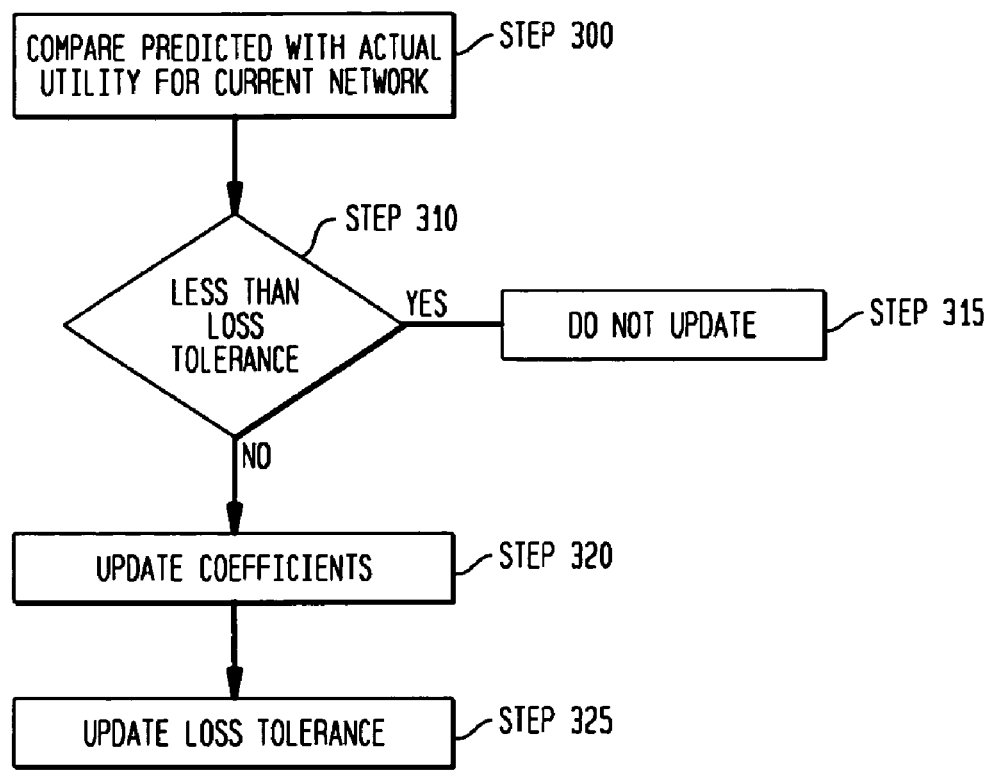
FIG. 3 illustrates a learning process according to an embodiment of the invention.

FIG. 3 illustrates the adaptive learning process for predicting the utility for each network. The utility is updated by sequential approximations $f = (f_1, \ldots, f_{m+1})$, where $f_1$ is some arbitrary initial hypothesis, e.g., $f_1$ is given by $f_1 \equiv 0$ ($f_1(x)=0$ for all $x \in X$); $f_t, t>1$, is the 'hypothesis' estimated after t−1 observations and $l(f_t, (x_t, y_t)$ is the loss incurred by the learning algorithm when trying to predict $y_t$ based on $x_t$ and the previous examples $((x_1, y_1), \ldots, (x_{t-1}, y_{t-1}))$.

At Step 300, a predicted value for the current network is compared with the actual utility value that is determined in Step 110. A difference between the two values is calculated.

The difference is compared with a variable loss tolerance, at Step 310. If the difference is less than the loss tolerance, the regression function is not updated, at Step 315.

On the other hand, if the difference is greater than the loss tolerance, the regression function is updated, at Steps 320 and 325. Step 320 varies the coefficients as will be defined below and Step 325 varies the loss tolerance as defined herein.

The regression function is defined as:

$$f_{t+1} := (1-\eta_t\lambda)f_t - \eta_t l'(f_t(x_t), y_t) k(x_t, \cdot)$$

with $$f_t(x) = \sum_{i=1}^{t-1} \alpha_i k(x_i, x), x \in X. \quad (13)$$

The coefficients for the expansion of $f_{t+1}$ at time t are calculated as:

$$\alpha_i := -\eta_t l'(f_t(x_t), y_t), i = t \quad (14)$$

$$\alpha_i := (1-\eta_t\lambda)\alpha_i, i < t \quad (15)$$

$\eta_t < 1/\lambda$ is a learning parameter, where $\lambda > 0$ is a penalty parameter that regularizes the risk, by penalizing the norm of the kernel regression function "f". If $\lambda > 0$ is large, the learning parameter $\eta_t < 1/\lambda$ is smaller, as are the resulting coefficients $\alpha_i$. The parameter $\lambda$ is used to control the storage requirements for the kernel expansion.

As noted above, the loss tolerance, i.e., $\epsilon$-insensitive loss, $l(f(x),y) := \max(0, |y - f(x)| - \epsilon)$ can be variable. Therefore, the loss function is written as $l(f(x),y) := \max(0, |y-f(x)| - \epsilon) + v\epsilon$, for some $0 < v < 1$.

Varying the value v varies the loss tolerance. In particular, v controls the fraction of points $f(x_i)$ which have a loss exceeding the loss tolerance $\epsilon$.

The new coefficients $\alpha_t, \alpha_i, i=1, \ldots, t-1$ in $f_{t+1}$ and new loss tolerance $\epsilon$ are given by the following update equations:

$$(\alpha_i, \alpha_t, \varepsilon) := \begin{cases} ((1-\lambda\eta)\alpha_i, \eta \text{sgn}(\delta_t), \varepsilon + (1-v)\eta), & |\delta_t| > \sigma \\ ((1-\lambda\eta)\alpha_i, 0, \varepsilon - \eta v), & \text{otherwise} \end{cases} \quad (16)$$

In an embodiment, the older input values, e.g., attributes, are aged such that the older values have less of an influence on the current estimation than the newer attributes. For example, at time t, the $\alpha_t$ coefficient may be initialized to a non-zero value, and the coefficients for the t–1 earlier terms decay by a factor depending on $\eta_t$.

In another embodiment, the decision to switch between networks, i.e., handoff, is application based. For example, if an application is expected to be used for a long period of time, an increase in a predicted utility from the current network to a new network could be small. However, if the application will be used for a short period of time, the increase in a predicted utility from the current network to a new network could be much larger to make the switch worthwhile. In accordance with this embodiment, multiple different utility thresholds are used to determine whether to switch networks. The thresholds can be in "percentage increases" between networks. For example, if the application is streaming video for a movie, the threshold can be a 5% increase between networks (accounting for switching costs). If the application is a text message, the threshold can be a 30% or larger increase between networks (accounting for switching costs).

In an embodiment, for different applications, the weights for the metrics are different.

Figure 4:
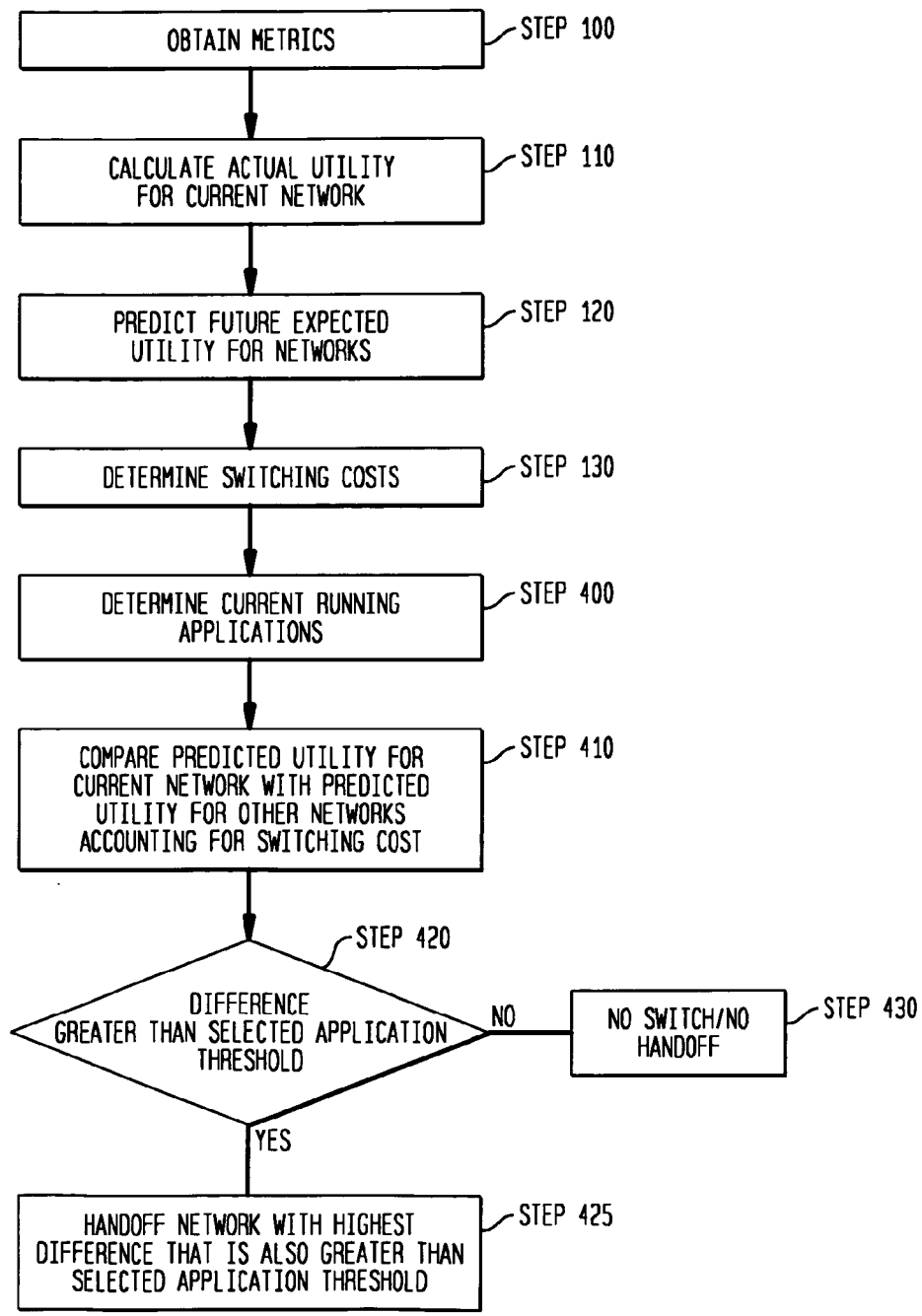
FIG. 4 illustrates a flow chart of an handoff decision method according to a second embodiment of the invention.

FIG. 4 illustrates a flow chart of an handoff decision method according to the second embodiment of the invention.

As illustrated, Steps 100-130 are the same as the first embodiment of the invention and, therefore, will not be described again.

Once all of the future utilities are predicted, a determination of all of the current pending and running applications are made, at Step 400. Application threshold values are retrieved for all pending applications. At Step 410, the predicted utility value for the current network is compared with each of the predicted utility values for the other networks and to calculate a utility difference for between the current network and each network. At Step 420, each utility difference is compared with the application threshold value. In an embodiment, the smallest threshold value among application threshold values for the pending application is selected for comparison. In another embodiment, largest threshold value among application threshold values for the pending application is selected for comparison. In another embodiment, an average of the application threshold values for the pending applications is selected for comparison.

If, at Step 420, a utility difference is larger than the selected application threshold, then the other network remains a candidate for handoff. The network that has the highest utility difference among the remaining candidates is selected for handoff and handoff occurs at Step 425. If none of the utility differences are larger than the selected application threshold, at Step 420, handoff does not occur, at Step 430.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A system comprising:
   a mobile communications device configured to receive one or more first selection metrics and one or more second selection metrics;
   a first network configured to communicate with the mobile communications device, wherein the one or more first selection metrics correspond to the first network;
   a second network configured to communicate with the mobile communications, device, wherein the one or more second selection metrics correspond to the second network;
   wherein the mobile communications device includes a processor configured to determine a first predicted utility value for the first network based at least in part on the one or more first selection metrics, wherein the first predicted utility value is determined using a function corresponding to the first network at a first predetermined time period, wherein the processor is further configured to determine a second predicted utility value for the second work based at least in part on the one or more second selection metrics, wherein the second predicted utility value is determined using a second function corresponding to the second work at a second predetermined time period, wherein the second function is specific to the second network, wherein the first function is specific to the first network and is different than the second function, and wherein the first predetermined time period is different from the second, predetermined time period, wherein the mobile communications device is configured to switch front the first work to the second network if the second predicted utility value exceeds the first predicted utility value.

2. The system of claim 1, wherein the first function comprises a first variable kernel regression function and the second function comprises a second variable kernel regression function.

3. The system of claim 1, wherein the first predetermined time period is based at least in part on a first handoff latency specific to the first network.

4. The system of claim 3, wherein the second predetermined time period is based at least in part on a second handoff latency of the second network.

5. The system of claim 4, wherein the second predetermined time period is further based at least in part on a make-up time, and wherein the make-up time comprises an amount of time that network connectivity is lost during a switch from the first network to the second network.

6. The system of claim 1, wherein the processor is further configured to
determine a switching cost of switching from the first network to the second network and determine a sum of the switching cost and the first predicted utility value,
wherein the processor is configured to switch from the first network to the second network only if the second predicted utility value is greater than the sum.

7. The system of claim 1, wherein the first predicted utility value
comprises an actual utility value based on one or more current values of the one or more first selection metrics.

8. The system of claim 1, wherein the processor is further configured to
determine an actual utility value corresponding to the first network and a difference between the actual utility value and the first predicted utility value,
wherein the processor ix configured to update the first function if the difference is greater than a loss tolerance value.

9. Tile system of claim 8, wherein the processor is configured to update
the loss tolerance value based at least in part on the difference.

10. The system of claim 1, wherein the one or more first selection metrics include an availability of the first network, wherein the availability is based at least in part on a signal strength of the first network.

11. The system of claim 1, wherein the one or more first selection metrics include a quality, of service of the first network, wherein the quality of service is based at least in part on one or more of a packet delay associated with tile first network or a bandwidth of the first network.

12. The system of claim 1, wherein the one or more first selection metrics include a cost of the first network, and wherein the cost includes at least one of a monetary cost for use of the first network or an energy cost associated with use of the first network.

13. The system of claim 1, wherein the one or more first selection metrics include a network policy of the first network, wherein the network policy includes one or more of a user classification, a user priority, an emergency service, or a network condition.

14. Tile system of claim 1, wherein the processor is configured to identify an application running on the mobile communications device and an application threshold corresponding to the application; wherein the processor is configured to determine a difference between the first predicted utility value and the second predicted utility value and switch from the first network to the second network only if the second predicted utility value exceeds the first predicted utility value by at least the application threshold.

15. The system of claim 14, wherein the application threshold comprises a smallest application threshold of a plurality of application thresholds corresponding to a plurality of applications running on tile mobile communication device.

16. The system of claim 14, wherein the application threshold comprises a largest application threshold of a plurality of application thresholds corresponding to a plurality of applications running on the mobile communications device.

17. The system of claim 14, wherein the application threshold comprises an average application threshold of a plurality of application thresholds corresponding to a plurality of applications running on the mobile communications device.

18. The system of claim 14, wherein the application threshold comprises a percentage by which the second predicted utility value is to exceed the first predicted utility value.

19. A system comprising:
a mobile communications device configured to run an application;
a first network configured to communicate with the mobile communications device; and a second network configured to communicate with the mobile communications device, wherein the mobile communications device is configured to determine a first predicted utility value for the first network, wherein the first predicted utility value is determined using a first function corresponding to the first network at a first predetermined time period,
wherein the mobile communications device is further configured to determine a second predicted utility value for the second network, wherein the second predicted utility value is determined using a second function corresponding to the second network at a second predetermined time period different from the first predetermined time period, wherein the second function is specific to the second network, and wherein the first function is specific to the first network and is different from the second function,
wherein the mobile communications device is further configured to determine a difference between the first predicted utility value and the second predicted utility value, identify an application threshold associated with the application running on the mobile communications device, and switch from the first network to the second network if the second predicted utility value exceeds the first predicted utility value by at least the application threshold.

20. A system comprising:
a communications device configured to receive one or more first selection metrics and one or more second selection metrics;
a first network configured to communication with the communications device, wherein the one or more first selection metrics correspond to the first network;
a second network configured to communicate with the communications device, wherein the one or more second selection metrics correspond to the second network;
wherein the communications device is configured to determine a first predicted utility value for the first network based at least in part on the one or more first selection metrics, wherein the second predicted utility value is determined using a second function corresponding to the second network at a second predetermined time period, and wherein the first predetermined time period is different from the second predetermined time period, wherein the mobile communications device is configured to switch from the first network to the second network if the second predicted utility value exceeds the first predicted utility value.

* * * * *